United States Patent [19]

Yariv et al.

[11] Patent Number: 5,353,382
[45] Date of Patent: * Oct. 4, 1994

[54] PROGRAMMABLE SYNAPSE FOR NEURAL NETWORK APPLICATIONS

[75] Inventors: Amnon Yariv, San Marino; Charles F. Neugebauer; Aharon J. Agranat, both of Pasadena, all of Calif.

[73] Assignee: California Institute of Technology, Pasadena, Calif.

[*] Notice: The portion of the term of this patent subsequent to Aug. 4, 2010 has been disclaimed.

[21] Appl. No.: 597,390

[22] Filed: Oct. 15, 1990

[51] Int. Cl.$^5$ ............................................. H03K 19/21
[52] U.S. Cl. ........................................ 395/24; 307/201
[58] Field of Search ........... 364/513, 900, 807, 728.01; 395/24, 23; 307/201

[56] References Cited

U.S. PATENT DOCUMENTS

| | | | |
|---|---|---|---|
| 4,950,917 | 8/1990 | Holler et al. | 395/24 |
| 4,956,564 | 9/1990 | Holler et al. | 395/24 |
| 4,961,002 | 10/1990 | Tam et al. | 395/24 |
| 4,962,342 | 10/1990 | Mead et al. | 395/24 |
| 5,014,235 | 5/1991 | Morton | 364/900 |
| 5,021,693 | 6/1991 | Shima | 395/24 |
| 5,028,810 | 7/1991 | Castro et al. | 395/24 |
| 5,034,918 | 7/1991 | Jeong | 395/24 |
| 5,040,134 | 8/1991 | Park | 395/24 |
| 5,059,814 | 10/1991 | Mead et al. | 395/24 |

OTHER PUBLICATIONS

"Analog VLSI Synaptic Matrix as Building Blocks for Neural Networks", Rossetto et al., 1989 IEEE.

Primary Examiner—Allen R. MacDonald
Assistant Examiner—George Davis
Attorney, Agent, or Firm—Leonard Tachner

[57] ABSTRACT

A synapse for neural network applications providing four quadrant feed-forward and feed-back modes in addition to an outer-product learning capability allowing learning in-situ. The invention, in its preferred embodiment, utilizes a novel two-transistor implementation which permits each synapse to be built in an integrated circuit chip surface area of only 20 by 20 micrometers. One of the two transistors at each synapse of the present invention comprises a floating gate structure composed of a floating gate electrode and a control electrode which permits learning upon application of incident ultraviolet light. During ultraviolet light application, a floating gate electrode voltage may be altered to modify the weight of each synapse in accordance with preselected criteria, based upon the input and output weight change vector elements corresponding to that particular matrix element. The second transistor corresponding to each synapse of the present invention provides a novel method for applying a voltage to the control electrode of the aforementioned floating gate structure of the first transistor. The voltage applied to the control electrode and thus the proportionate change in the floating gate electrode of the first transistor may be made proportional to the product of the corresponding input weight change vector element and the corresponding output weight change vector element, by using slope controllable ramp generators and phase controllable pulse generators, only one set of which must be provided for the entire matrix of synapses herein disclosed.

14 Claims, 4 Drawing Sheets

PROGRAMMABLE SYNAPSE FOR NEURAL NETWORK APPLICATIONS

TECHNICAL FIELD

The present invention relates generally to neural networks and more specifically to a programmable synapse for use therein, wherein only two transistors are needed to provide four quadrant feed-forward and feed-back modes, in addition to providing outer-product learning implementation.

BACKGROUND ART

Neural Network models, which evolved from efforts to understand neurophysiological and psychological phenomena, are now being considered for performing various artificial intelligence tasks. However, further advance in this field is limited due to the absence of reliable and efficient hardware realizations of neural network models.

A typical neural network model consists of many simple processing units called the neurons, each connected to many or all the others. The state of the network is the collective state of the neurons, and the data stored in it is distributed as the strength of the connections between the neurons called synapses. Consequently, realizing neural network models using electronics poses severe problems:

a) The synapses require a very complex wiring scheme virtually impossible to achieve with integrated circuit techniques;

b) "Teaching" the network to modify the synapses is a slow process in an electronic system which must be addressed serially through its regular input/output ports.

The neurons can be binary: e.g., $V=\{0,1\}$, or they can be analog: e.g., $V=[-a,a]$ where "a" is some real number. As just noted above, the neurons are interconnected by synapses, the strength of which is given by the synaptic interaction matrix W, where $W_{ij}$ designates the strength of the connection from j'th neuron to the i'th neuron. Each neuron is updated according to the total current that flows into it, namely $I_i$ for the i'th neuron where $$I_i = \Sigma W_{ij} * V_j$$

By using some decision process, such as designated by the equation $$\widetilde{V}_i = \phi(I_i, b_i)$$

where $b_i$ is a constant parameter of the i'th neuron, the next state $\widetilde{V}$ of the i'th neuron is determined.

One possible application of neural network models is as content addressable (associative) memories. In that application, a set of p N-dimensional vector s, $V^{(s)}$ s=1 . . . p, are stored in the network by modifying the synapses using some "learning rule". For example, the learning rule used by Hopfield to store $V^{(s)}$, s=1 . . . p, N-dimensional vectors in a binary N-dimensional network is $$W_{ij} = \sum_{s=1}^{p} (2V_i^{(s)} - 1)(2V_j^{(s)} - 1).$$

It was shown by Hopfield that each of the stored vectors $V^{(s)}$ will be a stable state of the network. Moreover, it is expected that if the system is not in one of the stable states ($V^{(0)} \neq V^{(s)}$, s=1 . . . p), it will be attracted to the stable state which is the closest to its initial state. The $W_{ij}$'s are not necessarily computed in advance and loaded into the network prior to its operation. One of the interesting features of neural network models is the ability to perform independent learning. Here the $W_{ij}$'s are modified according to the reaction of the network to some teaching pattern, as done for example when the "back error propagation" learning method is applied.

The neural network models can be updated either synchronously or asynchronously. In the synchronous case, the neural network model is updated in cycles. For each cycle, the state of each neuron is set according to the state of the neural network model in the previous cycle. In the asynchronous case, each neuron is updated according to the state of the neural network model at the updating moment.

It is well-known in the neural network or intelligent computer arts that a synapse is one name given to a matrix element of a matrix in which an input vector (representing the input neurons) multiplies the matrix elements to produce an output vector (representing the output neurons). In many applications such matrices or plurality of synapses are implemented in the form of integrated circuits on a single chip. It is often critical to minimize the size of the surface area that is required on the chip to implement each synapse or matrix element. The size of each matrix element is generally directly proportional to the number of transistors required to implement it and also to the capabilities within each such matrix element. By way of example, it generally requires more transistors within each synapse or matrix element to provide a learning capability wherein the weight of each matrix element may be altered in what is commonly known in the art as an outer-product learning implementation. In such an implementation, the weight is changed in proportion to the product of the input and output weight change vectors corresponding to that particular matrix element. Learning is an important characteristic of neural network applications because it tends to simulate what is believed to be actual neuron operation wherein the effect of each operation changes or modifies the communication characteristic of the neuron by altering the synapse behavior. The learning described here is 'Hebbian' Learning where the weight change is proportional to the product of the input and output states.

$$\Delta W_{ij} = V_j \widetilde{V}_i$$

Other Learning rules (back error propagation) are more complex in that the outer product vectors can be different from the input and output vectors.

$$\Delta W_{ij} = \beta_j \delta_i$$

One typical implementation of a synapse or matrix element used in neural network applications in the form of an integrated circuit chip, comprises an Intel model 80170NW wherein each synapse requires six transistors occupying a total solid state surface area of approximately 50 by 50 micrometers, or approximately 2500 micrometers squared. Unfortunately, this particular typical prior art synapse implementation does not provide an on chip learning capability.

There is therefore a need to provide an implementation of a synapse for neural network applications, wherein not only is the size reduced in order to permit an increased number of synapses or matrix elements on one chip, but wherein the number of transistors is reduced per matrix element and wherein a learning capability is provided in-situ.

SUMMARY OF THE INVENTION

The present invention meets the aforementioned need by providing an extremely small implementation of a synapse for neural network applications providing four quadrant feed-forward and feed-back vector-matrix multiplication modes in addition to an outer-product learning capability allowing learning in-situ. The invention, in its preferred embodiment, utilizes a novel two-transistor implementation which permits each synapse to be built in an integrated circuit chip surface area of only 20 by 20 micrometers. The synapse of the present invention performs both four quadrant feed-forward and feed-back multiply-accumulate operations in addition to implementing a non-volatile synaptic weight storage with four quadrant outer-product modification. Implementation using only two transistors per synapse makes it extremely small and allows tens of thousands of synapses per chip to be implemented.

One of the two transistors at each synapse of the present invention comprises a floating gate structure which permits learning upon application of incident ultraviolet light. During ultraviolet light application, a floating gate electrode voltage may be altered to modify the weight of each synapse in accordance with preselected criteria, based upon the weight change vectors of that particular matrix element. The second transistor corresponding to each synapse of the present invention provides a novel method for applying a voltage to the control electrode of the aforementioned floating gate structure of the first transistor. The voltage applied to the control electrode and thus the proportionate change in the floating gate electrode of the first transistor may be made proportional to a magnitude of the input and output weight change vectors, by using slope controllable ramp generators and phase controllable pulse generators, only one set of which must be provided for the entire matrix of synapses herein disclosed. The details of the two transistor implementation of each synapse of the present invention will be more fully understood hereinafter. It is important to differentiate between the neuron (input and output) vectors and the weight change vectors (one at the neuron input location and one at the neuron output location, both going into the matrix for outer product multiplication).

OBJECTS OF THE INVENTION

It is therefore a principal object of the present invention to provide a synapse for neural network applications wherein only one transistor is needed to provide four quadrant feed-forward and feed-back modes of operation.

It is an additional object of the present invention to provide an extremely small synapse for neural network applications wherein each such synapse provides outer-product learning implementation requiring only two transistors and only about 400 micrometers squared for each such synapse on an integrated circuit chip.

It is still an additional object of the present invention to provide a programmable synapse for neural network applications using two transistors, one of which is implemented with a floating gate structure, whereby only upon the application of ultraviolet light is it possible to alter the gate-voltage of a synapse transistor which corresponds to the synapse weighting and where upon removal of ultraviolet light, the synapse weighting must remain constant and cannot be changed, thereby providing programming with storage.

It is still an additional object of the present invention to provide a programmable synapse using two transistors, wherein one such transistor provides a floating gate structure to permit a change in the synapse weighting and wherein the other transistor is used to apply selected activation signals to the floating gate structure of the first transistor in order to modify the synapse weighting as an outer-product learning implementation.

BRIEF DESCRIPTION OF THE DRAWINGS

The aforementioned objects and advantages, as well as additional objects and advantages thereof, will be more fully understood as a result of a detailed description of a preferred embodiment when taken in conjunction with the following drawings in which.

DETAILED DESCRIPTION OF A PREFERRED EMBODIMENT

A single transistor can be used as a four quadrant multiplier if it is biased in the triode region. In this region, the source and drain voltages are within 0.5 volts of one another, while the gate-voltage is substantially above both the voltage at the source and the drain. The drain current ($I_d$) is then proportional to the gate-voltage ($V_g$) multiplied by the drain-source difference ($V_{ds}$), i.e.

$$I_d = k * V_g * V_{ds}$$

where k is a constant that depends on the size of the transistor. Note that this single transistor implements a two quadrant multiplication. More specifically, $V_g$ is positive while $V_{ds}$ can be either positive or negative.

The basic neural network accumulation equation (basically a vector matrix multiplication) is the following:

$$I_i = \Sigma W_{ij} * V_j$$

where $V_j$ is equivalent to $V_{ds}$ and $W_{ij}$ is proportional to $V_g$. Unfortunately this particular analogy, using a conventional transistor configuration, lacks negative weights because $V_g$ is restricted to be positive. However, if one breaks the equation into two parts, we can externally compensate for this inadequacy $$I_i = \Sigma (W_{ij} - \Delta) * V_j = \Sigma W_{ij} * V_j - \Delta \Sigma V_j$$

where $\Delta$ is the weight offset. Note that the second sum only involves $V_j$. Thus for a vector matrix product, this term need only be calculated once for the entire array. This calculation can easily be implemented as an extra column of constant weights whose output is subtracted from the output of all other columns. In this manner, four quadrant multiplication may be achieved.

Figure 1:
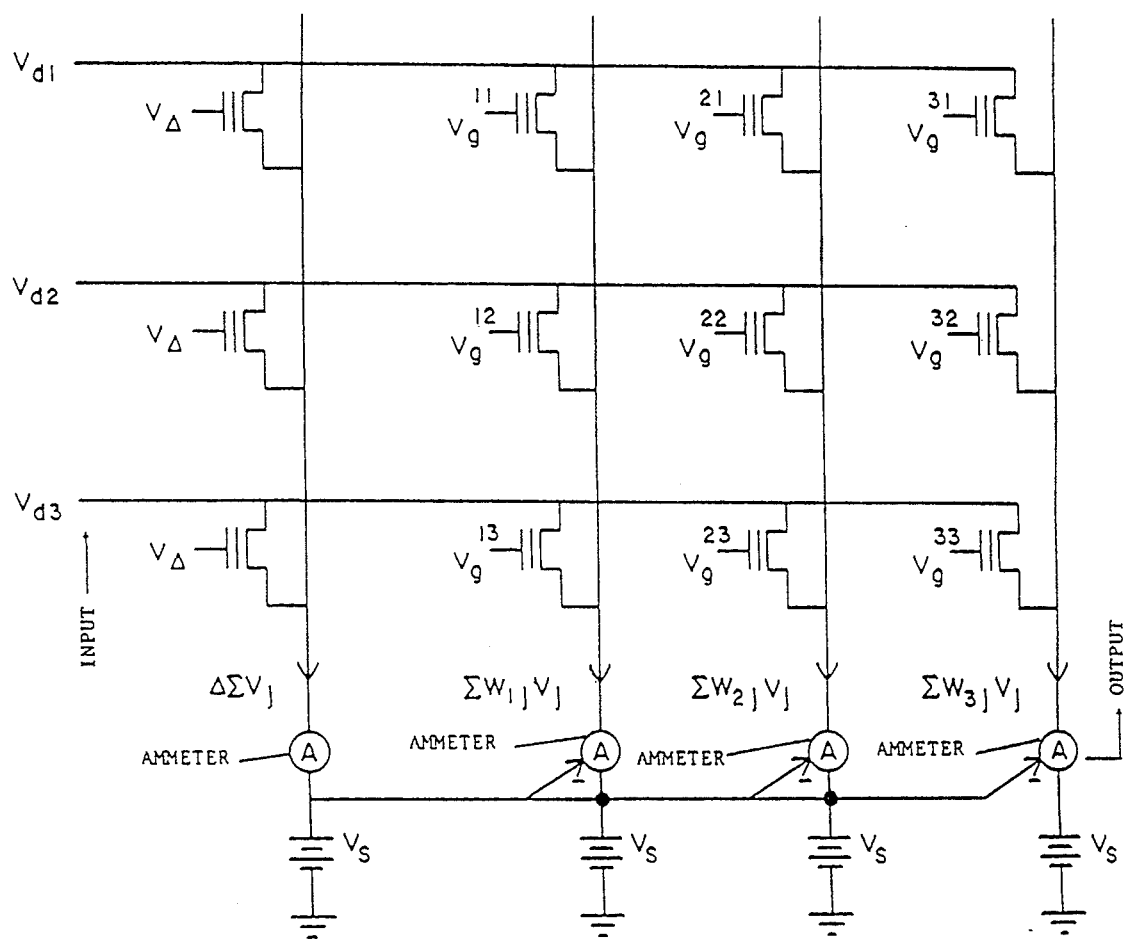
FIG. 1 is a floating gate network implementation of the single transistor configuration of the present invention.

The system architecture of such an implementation is shown in FIG. 1. A single transistor is provided at each synapse with its gate-voltage which is proportional to $W_{ij}$ being determined by a floating gate in the particular implementation shown herein. It should be understood that the floating gate of the single transistor shown at each synapse of FIG. 1 is required to implement the learning feature of the present invention. Furthermore, each such transistor need not be of a floating gate structure if the present invention is implemented in a non-learning configuration. In such a configuration, each $V_g$ would be connected to a voltage source which may be varied at each synapse. However, the floating gate configuration is a preferred configuration because it permits the gate-voltage of each transistor to be different from the other transistors of the matrix and provides a built-in storage capability, wherein it becomes unnecessary to apply constant voltage to each transistor gate.

In the preferred configuration illustrated in FIG. 1, the gate-voltage at each transistor, which is proportional to $W_{ij}$, is determined by a floating gate configuration. The column current lines are biased at a fixed potential $V_s$, while the row lines are held at voltages proportional to the $V_j$'s. The current flowing through each transistor will be proportional to $W_{ij} * V_j$. These currents are summed vertically and thus the net current flowing out of the i'th column line is proportional to $I_i$. An extra column of transistors is added along the left to provide the $$\sum_j V_j$$

term, derived from a $V_\Delta$ gate voltage at each rom representing a voltage equal to the weight offset. The current in the extra column of FIG. 1 is subsequently subtracted from every other column line to provide full four quadrant multiplication as previously described. This subtraction implementation is shown schematically at the lower portion of each column of FIG. 1.

Figure 2:
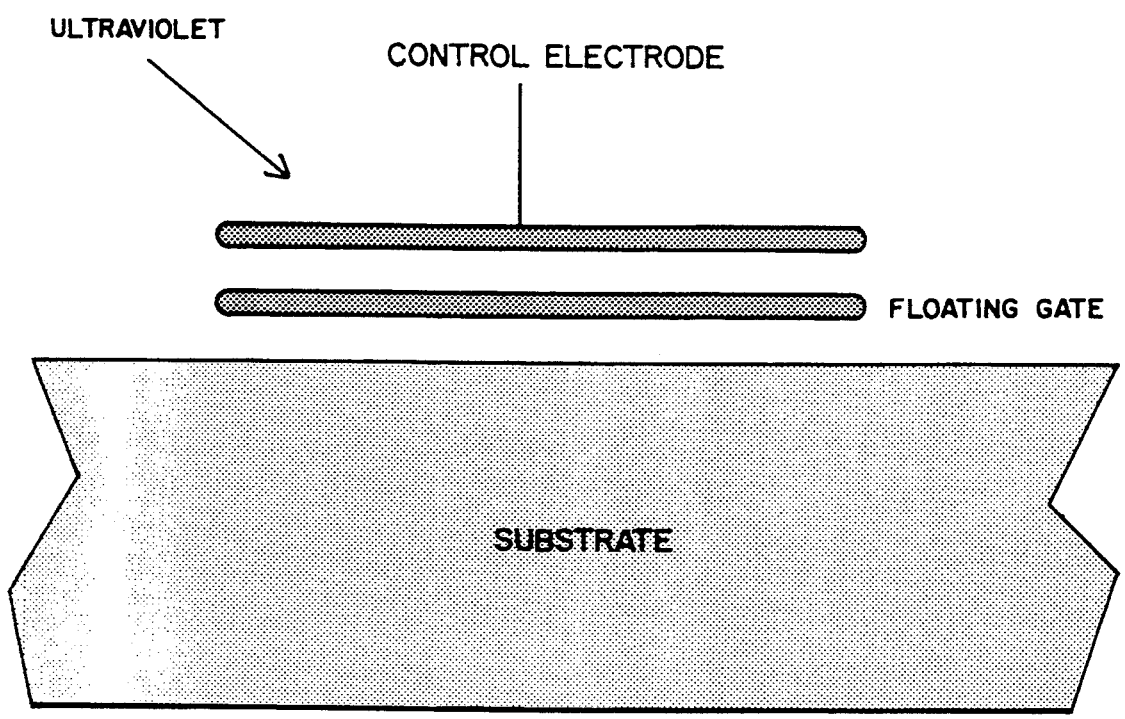
FIG. 2 is a schematic illustration of a floating gate structure transistor that may be used at each synapse of the present invention to provide a programmability feature.

In the floating gate structure implementation of the present invention, the gate-voltage contains information about the synaptic strength and is determined by how much charge sits on a floating gate shown in FIG. 2. The lower polysilicon gate is completely surrounded by silicon dioxide, whereas the upper control gate is connected to another circuit. In order to program the gate to a slightly different potential, ultraviolet light is incident on the circuit of FIG. 2. This causes electrons to be excited into the conduction band of the oxide, which in turn causes the oxide to act as a very weak, but non-negligible resistor. The potential on the floating gate then behaves like a classical RC circuit, i.e. the voltage of the floating gate exponentially approaches the voltage of the upper control gate. The time scale of this process is on the order of seconds and allows precise control of the amount of charge to the connection by simply timing the ultraviolet light accurately.

Figure 3:
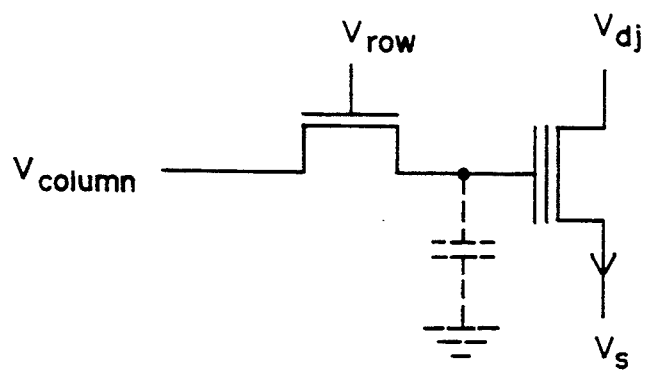
FIG. 3 is a schematic illustration of the two transistor synapse implementation of the present invention, showing the use of a second transistor of a conventional gate structure that is used to apply a programmable voltage to the control electrode of the floating gate structure of the present invention.

Most local learning rules involve changing the synaptic interconnection matrix based on the outer-product of two vectors. One vector is generated from the output side of the connection and the other vector is generated from the input side. This is implemented in this architecture by a grid of wires, vertical ones containing the output learning vector and horizontal ones containing the input learning vector. It is then the task of the synapse to take row (input side) and column (output side) values, multiply them together and apply the product as a weight change. A simple circuit that accomplishes this weight change task is shown in FIG. 3. To minimize the area of the synapse, a single transistor is used in addition to the floating gate structure previously described in conjunction with FIGS. 1 and 2. Despite its simplicity, this configuration can compute a fully analog four quadrant change to the synapse.

Figure 4:
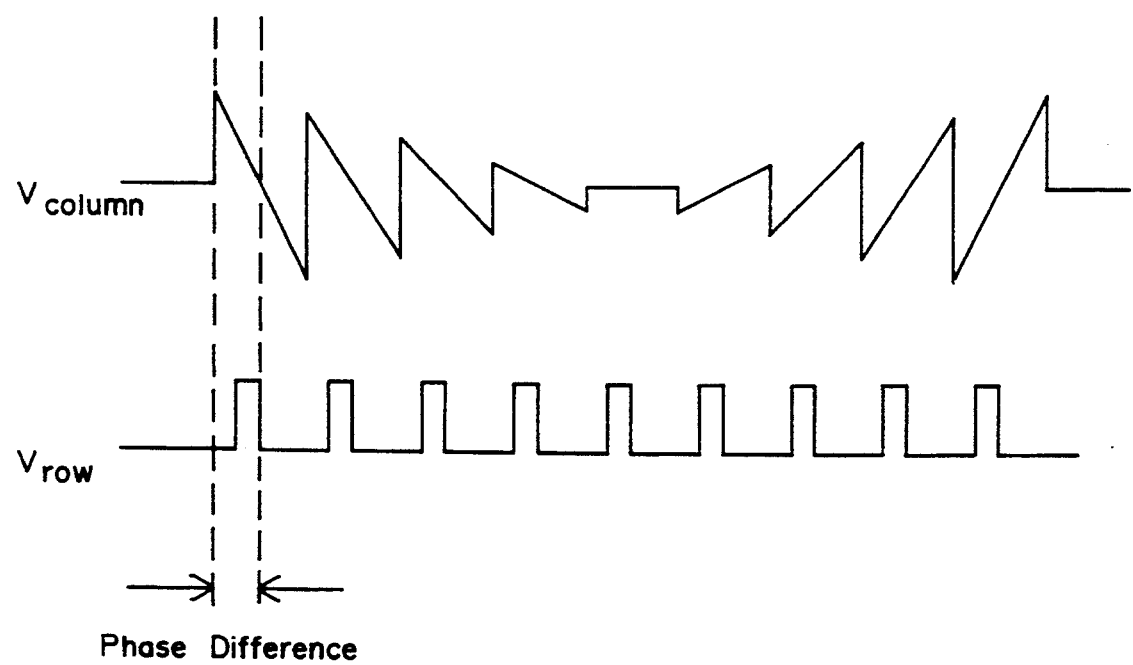
FIG. 4 is a graphical representation of typical signals that may be applied to the input terminals of the conventional gate transistor of FIG. 3 in order to program the floating gate transistor thereof in accordance with the weight change vectors of the matrix element corresponding to a particular synapse.

Weight changing signals are time multiplexed onto the row and column lines. The column line contains a ramp whose slope is continuously variable with respect to time through both positive and negative values. The row line contains a logical pulse train whose phase is continuously variable with respect to the phase of the column ramp. FIG. 4 illustrates typical column voltage signal and row voltage signal wave forms. As seen in FIG.4, the column voltage signal is basically a ramp generated signal wherein the slope of the ramp may be varied from approximately $-1$ to $+1$. On the other hand, the row voltage signal wave form is a plurality of pulses of rectangular configuration, the phase of which relative to the phase of the column voltage wave form determines the relative variation of the row control voltage. Thus by making the row voltage wave form phase proportional to the value of the signal or voltage at the corresponding row input weight change vector element and by making the slope of the column voltage wave form proportional to the corresponding column or output weight change vector element, one has achieved the desired multiplication product capability for programming. Of course, it will be understood that this programming is intended to alter the value $V_g$ at each synapse and this is accomplished by merely applying a modification to the control electrode of each transistor of each floating gate structure transistor while applying an ultraviolet light activation so that the floating gate of each such transistor can be allowed to vary in the direction of the gate-voltage which is in turn proportional to Vrow and Vcol as depicted in FIG. 4.

Using the parasitic capacitance of the floating gate's control electrode as a temporary storage node, the four quadrant multiplication occurs as a result of the relative timing of these two lines, namely, the row line and the column line. The net result is a voltage on the floating gate's control electrode which is proportional to the product of the slope of the ramp and the phase of the row gating pulse, both of which can be positive or negative. Thus, when the ultraviolet light is applied for a short time, the voltage on the floating gate changes at a nearly constant rate (the beginning of an exponential) that is proportional to the voltage of the control gate. Thus a small weight change can be implemented for the whole matrix in parallel. The weight change is proportional to the outer-product of two vectors by applying the proper slope of the ramp generator signal to the corresponding column line and the proper phase relative to the ramp generator signal of the pulse generator signal to the corresponding row line, while shining an ultraviolet light on the integrated circuit chip.

Figure 5:
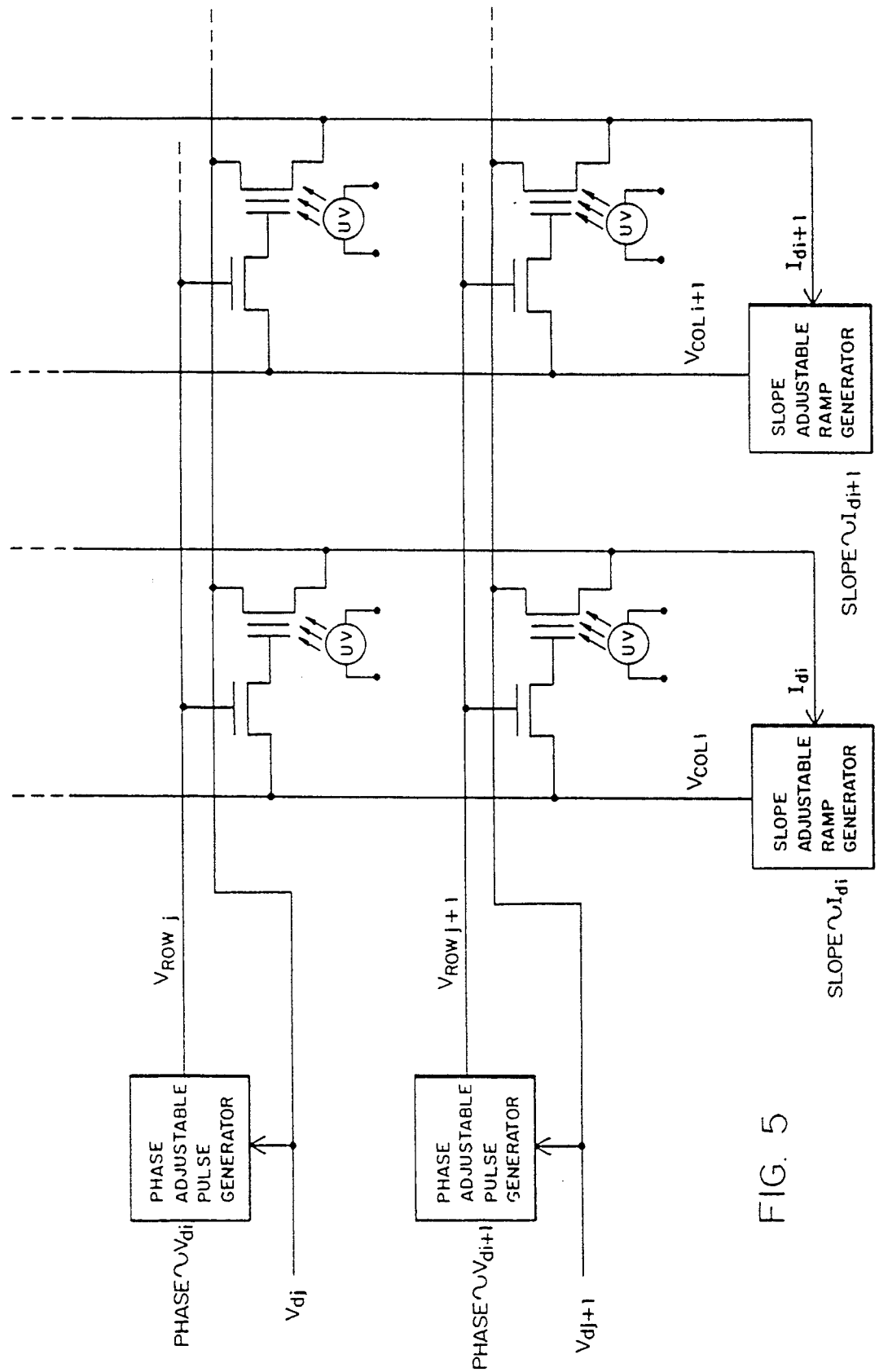
FIG. 5 is a schematic/block diagram illustration of a portion of the matrix in which the synapse of the present invention may be used and showing therein the use of a plurality of slope adjustable ramp generators and phase adjustable pulse generators which may be used to modify the gate-voltage of a transistor of the present invention in accordance with a learning program.

A representative illustration of an implementation using a set of phase adjustable pulse generators for control of Vrow and slope adjustable generators for control of Vcol during the programming operation is shown in FIG. 5. As illustrated therein, there is a phase adjustable pulse generator for each row of the matrix of synapses of the present invention and a slope adjustable ramp generator for each column of the matrix of synapses of the present invention. The slope of each slope adjustable ramp generator is made proportional to the output weight change vector element with which it is associated and the relative phase of the phase adjustable pulse generator of each row is adjusted to correspond to the input weight change vector element with which it is associated. The ultimate modification in Vg of the floating gate structure transistor at each synapse is thus made proportional to the product of both the input weight change vector and the output weight change vector in accordance with an outer-product learning implementation.

The simple synapse described herein can be used in both feed-forward and feed-back modes. In the feed-back mode, the column lines are used for input and the row lines used for current summing. The synapse transistor has no preferred direction and works equally well in both directions. The feedback mode computes with the transpose of the weight matrix and is useful for learning rules such as Back Error Propagation. Back Error Propagation (BEP) is an "incremental" outer product learning rule. At each learning stage, a small weight change occurs $$W_{ij} = W_{ij} + \Delta W_{ij}$$

The outer product is used to calculate the $\Delta W_{ij}$. For BEP $$\Delta W_{ij} = V_j \delta_i f'(I_i) \cdot \eta$$

where
- $V_j$ = input neuron value
- $f'(I_i)$ = derivative of the sigmoid or activation function evaluated at $I_i$
- $\delta_i$ = error at output neuron (evaluated by running the network in a feedback mode)
- $\eta$ = constant increment In the present invention the weight change vectors can be anything. The step size ($\eta$) is controllable by timing the UV exposure or adjusting the UV source intensity. Small $\eta$ corresponds to low illumination.

It will now be understood that what has been disclosed herein comprises a unique and highly advantageous implementation of a neural network with fully analog four-quadrant feed-forward and feed-back connections and an outer-product learning rule. One of the most significant advantageous features of the present invention is that each such relatively sophisticated synapse (sophisticated in performance) contains only two transistors, making it extremely small and allowing a large 100,000 synapse chip to be easily realized with currently available CMOS technology. The expected computation time is roughly 10 microseconds based on previously fabricated devices. This gives a theoretical rating of $10^{10}$ analog connections per second per chip with the learning rule built-in in a complete autonomous, non-volatile neural network, all on a single chip. The present invention would find particularly advantageous use in fast, on-chip learning applications such as speech and vision processing as well as in self-programmable systems.

Those having skill in the art to which the present invention pertains will now, as a result of the applicants' teaching herein, perceive various modifications and additions which may be made to the invention. By way of example, four-quadrant learning is described in the present invention by means of the use of slope variable ramp generators in conjunction with phase variable pulse generators. However, numerous other ways of generating modifications in the gate-voltage of each synapse transistor may be provided by using other signals that may be different in configuration and implementation as compared to the specific signals described herein. Furthermore, as previously alluded to hereinabove, the use of a floating gate structure at the weight variable transistor of each synapse or matrix element may be substituted with a single gate structure transistor of a conventional configuration where learning is not needed or desired. It is possible to control the gate-voltage on each such transistor in other ways such as by electrically connecting each such gate of each such transistor to a source of voltage or other form of voltage storage, such as a capacitor. Even with alternate forms of gate-voltage variable transistors, the four-quadrant vector-matrix multiplication feature of the present invention may be provided with an extra column of fixed offset values the current of which is subtracted from the respective currents in the remaining columns of the matrix herein. Accordingly, all such modifications and additions are deemed to be within the scope of the invention which is to limited only by the claims appended hereto.

We claim:

1. In a vector-matrix multiplier of the type having a plurality of input lines and output lines corresponding to elements of input and output vectors, respectively, and a plurality of matrix elements, one such respective matrix element corresponding to each combination of a respective input line and a respective output line;

each such matrix element comprising a single transistor operating in its triode region, having a drain-source difference voltage proportional to the value of said input vector element corresponding to said matrix element, having a gate-voltage proportional to the value of said matrix element and having a drain current proportional to the product of said input vector element value and said matrix element value;

each such output line being connected to a plurality of matrix elements such that said drain currents proportional to the product of said input line values and said matrix element values are summed to form a total output line current proportional to one element of said output vector; and a programmable plurality of said matrix elements having constant values and providing an offset drain current in their common output line; said offset drain current being subtracted from each respective drain current in the remaining ones of said output lines for providing four quadrant vector-matrix multiplication.

2. The multiplier recited in claim 1, wherein each said single transistor comprises a floating gate electrode and a control electrode, the voltage at said floating gate electrode being dependent upon the voltage applied to said control electrode when ultraviolet light is applied to said transistor and remaining constant upon the removal of said ultraviolet light.

3. The multiplier recited in claim 2 wherein each said matrix element comprises an additional transistor connected to the control electrode for altering the gate-voltage of said single transistor.

4. The multiplier recited in claim 3 further comprising means for applying an adjustable-slope-ramp drain voltage to said additional transistor and an adjustable-phase-pulse, gate-voltage to said additional transistor, the slope of said ramp voltage being dependent upon the value of the corresponding element of an output weight change vector and the relative phase of said gate-voltage being dependent upon the value of the corresponding element of an input weight change vector.

5. The multiplier recited in claim 1 wherein each said matrix element comprises an additional transistor connected to the gate electrode of said single transistor for applying a gate-voltage thereto.

6. The multiplier recited in claim 5 further comprising means for applying an adjustable-slope-ramp drain voltage to said additional transistor and an adjustable-phase-pulse, gate-voltage to said additional transistor, the slope of said ramp voltage being dependent upon the value of the corresponding element of an output weight change vector and the relative phase of said gate-voltage being dependent upon the value of the corresponding element of an input weight change vector.

7. The multiplier recited in claim 1 further comprising means for modifying the gate-voltage of each such matrix element transistor in proportion to the outer product of an input weight change vector and an output weight change vector corresponding to each such matrix element after each vector-matrix multiplication.

8. A vector-matrix multiplier of the type having a plurality of input lines and output lines corresponding to elements of input and output vectors, respectively, and a plurality of matrix elements, one such respective matrix element corresponding to each combination of a respective input line and a respective output line;

each such matrix element comprising a single transistor operating in its triode region, having a drain-source difference voltage proportional to the value of said input vector element corresponding to said matrix element, having a gate-voltage proportional to the value of said matrix element and having a drain current proportional to the product of said input vector element value and said matrix element value;

each such output line being connected to a plurality of matrix elements such that said drain currents proportional to the product of said input line values and said matrix element values are summed to form a total output line current proportional to one element of said output vector; and each said single transistor comprising a floating gate electrode and a control electrode, the voltage at said floating gate electrode being dependent upon the voltage applied to said control electrode when ultraviolet light is applied to said transistor and remaining constant upon the removal of said ultraviolet light.

9. The multiplier recited in claim 8 wherein each said matrix element comprises an additional transistor connected to the control electrode of said single transistor for applying a gate-voltage thereto.

10. The multiplier recited in claim 9 further comprising means for applying an adjustable-slope-ramp drain voltage to said additional transistor and an adjustable-phase-pulse, gate-voltage to said additional transistor, the slope of said ramp voltage being dependent upon the value of the corresponding element of an output weight change vector and the relative phase of said gate-voltage being dependent upon the value of the corresponding element of an input weight change vector.

11. The multiplier recited in claim 8 wherein each said matrix element comprises an additional transistor connected to the control electrode of said single transistor for altering the gate-voltage of said single transistor.

12. The multiplier recited in claim 11 further comprising means for applying an adjustable-slope-ramp drain voltage to said additional transistor and an adjustable-phase-pulse, gate-voltage to said additional transistor, the slope of said ramp voltage being dependent upon the value of the corresponding element of an output weight change vector and the relative phase of said gate-voltage being dependent upon the value of the corresponding element of an input weight change vector.

13. The multiplier recited in claim 8 further comprising means for modifying the gate-voltage of each such matrix element transistor in proportion to the product of an input weight change vector element and output weight change vector element corresponding to each such matrix element.

14. A vector-matrix multiplier of the type having a plurality of input lines and output lines, and a plurality of matrix elements, one such respective matrix element corresponding to each combination of a respective input line and a respective output line;

each such matrix element comprising a single transistor operating in its triode region, having a drain-source difference voltage proportional to the value of said input vector element corresponding to said matrix element, having a gate-voltage proportional to the value of said matrix element and having a drain current proportional to the product of said input vector element value and said matrix element value;

each such output line being connected to a plurality of matrix elements such that said drain currents proportional to the product of said input line values and said matrix element values are summed to form a total output line current proportional to one element of said output vector;

a programmable plurality of said matrix elements having constant values and providing a single drain current in their common output line; said single drain current being subtracted from the current in each respective remaining one of said output lines for providing four quadrant vector-matrix multiplication;

each such single transistor comprising a floating gate electrode and a control electrode, the voltage of the gate of said single transistor being equal to the voltage of said floating gate electrode, the voltage of said floating gate electrode being dependent upon the voltage applied to said control electrode when ultraviolet light is applied to said transistor, said floating gate electrode voltage remaining constant upon the removal of said ultraviolet light;

each said matrix element comprising an additional transistor connected to the control electrode of said single transistor for altering the gate-voltage of said single transistor;

means for applying an adjustable-slope-ramp drain voltage to said additional transistor and an adjustable-phase-pulse, gate-voltage to said additional transistor, the slope of said ramp voltage being dependent upon the value of the corresponding element of an output weight change vector and the relative phase of said gate-voltage being dependent upon the value of the corresponding element of an input weight change vector; and wherein each such matrix element constitutes synapse in a neural network.

* * * * *